United States Patent [19]

Kimoto

[11] Patent Number: 5,520,150
[45] Date of Patent: May 28, 1996

[54] APPARATUS AND METHOD FOR DRIVING AND CONTROLLING A STEPPING MOTOR

[75] Inventor: Yasuhiro Kimoto, Himeji, Japan

[73] Assignee: Mitsubishi Denki Kabushiki Kaisha, Tokyo, Japan

[21] Appl. No.: 271,498

[22] Filed: Jul. 7, 1994

[30] Foreign Application Priority Data

Jul. 29, 1993 [JP] Japan ................................ 5-187909

[51] Int. Cl.⁶ .................................................. F02M 3/00
[52] U.S. Cl. ...................................................... 123/339.26
[58] Field of Search ............................. 123/339.26, 585, 123/682, 586, 587

[56] References Cited

U.S. PATENT DOCUMENTS

| | | | |
|---|---|---|---|
| 4,359,983 | 11/1982 | Carlson et al. | 123/339.26 |
| 4,453,515 | 6/1984 | Saji et al. | 123/339.26 |
| 4,469,064 | 9/1984 | Manaka et al. | 123/339.26 |
| 4,488,524 | 12/1984 | Sugiura et al. | 123/333.26 |

FOREIGN PATENT DOCUMENTS 57-26238  7/1982  Japan .................................. 123/339

*Primary Examiner*—Raymond A. Nelli
*Attorney, Agent, or Firm*—Sughrue, Mion, Zinn, Macpeak & Seas

[57] ABSTRACT

An improvement to a controller of a step motor for a by-pass valve of an internal combustion engine is disclosed. After the engine is shut off, the valve is initialized to obtain accurate correspondence between the controller, the step motor, and the valve's position. The valve is first driven to a maximum open position. Thereafter, the valve is driven to a target position. In addition, a motor excitation pattern which the controller generates upon resetting is stored in a memory. According to one embodiment, the amount of motor rotation for reaching the target position is so determined that the last excitation pattern delivered to the motor matches the excitation pattern stored in the memory. According to another embodiment, a stopper is provided on the valve at the fully open position. After the engine is turned off, the motor is first energized to bring the valve against the stopper. Thereafter the motor is energized in the direction surpassing the fully open position. The amount of rotation of the motor is calculated so that the last excitation pattern sent to the motor matches that which was sent to the motor in bringing the valve against the stopper. The motor position is then initialized as the reference fully open position. Finally, the motor is energized to bring the valve to the target position.

8 Claims, 7 Drawing Sheets

FIG. 3

| | EXCITATION PATTERNS | | | |
|---|---|---|---|---|
| | A1 | A2 | A3 | A4 |
| STEPPING MOTOR DRIVE SIGNAL 201 | ON | ON | OFF | OFF |
| STEPPING MOTOR DRIVE SIGNAL 202 | OFF | OFF | ON | ON |
| STEPPING MOTOR DRIVE SIGNAL 203 | ON | OFF | OFF | ON |
| STEPPING MOTOR DRIVE SIGNAL 204 | OFF | ON | ON | OFF |
| AIR INTAKE AMOUNT REGULATING VALVE 31 | CLOSE ←――――――――――――――→ OPEN (BACKWARD DIRECTION)        (FORWARD DIRECTION) | | | |

APPARATUS AND METHOD FOR DRIVING AND CONTROLLING A STEPPING MOTOR

BACKGROUND OF THE INVENTION

1. Field of the Invention

The present invention relates to an apparatus and method for driving and controlling a stepping motor by switching in sequence a plurality of exciting phases in order to control the operating state of an internal combustion engine.

2. Description of the Related Art

Intake air amount of internal combustion engine can be regulated by an intake air amount control apparatus employing a stepping motor drive control in order to drive a stepping motor. The stepping motor is driven as a result of an excitation pattern selected from a plurality of predetermined excitation patterns. The selected excitation patterns are switched in sequence. The direction in which the stepping motor is driven is changed by switching the switching sequence of the selected excitation pattern forwardly or backwardly.

In a conventional intake air amount control apparatus, when an intake air amount regulating valve is opened, the stepping motor is driven forwardly by switching the excitation pattern forwardly for a required number of times. On the other hand, when the intake air amount regulating valve is closed, the stepping motor is driven by switching the excitation pattern backwardly for a required number of times.

Generally, the direction in which the excitation pattern is switched when the stepping motor is being driven, and the number of times the excitation pattern is switched are determined on the basis of the relation between the actual position and the target position of the stepping motor and the difference between these positions.

The target position of the stepping motor is an indicator corresponding to the target opening of the intake air amount regulating valve. The target position of the stepping motor is calculated on the basis of the optimum opening of the intake air amount regulating valve, corresponding to the operating state of the internal combustion engine. The optimum opening is previously stored in the memory.

The actual position of the stepping motor is an indicator corresponding to the actual opening of the intake air amount regulating valve. The actual position of the stepping motor is determined as follows. The position at the time when the initialization is terminated in the stepping motor is assumed as a reference position. Subsequently, the number of times the excitation pattern is switched is summed along the direction in which the excitation pattern is switched. The summation is performed when the stepping motor is driven at the position corresponding to the reference position.

The initialization of the stepping motor is usually performed during key off time when the power supply is stopped. Therefore, an electric current is supplied to the apparatus for driving and controlling the stepping motor for a fixed amount of time after key off. The initialization is performed in the fixed time after the key off. Methods for initializing the stepping motor include a method disclosed in, for example, Japanese Patent Laid-Open No. 57-26238.

Initially, the stepping motor is driven so that the maximum open/close range of the intake air amount regulating valve is exceeded, causing the intake air amount regulating valve to hit a stopper at a maximum drive opening. The position of the stepping motor at this time is assumed as a reference position. Then, the stepping motor is driven so that the actual position of the stepping motor becomes a predetermined target position of the stepping motor during key off. The position of the stepping motor at this time is assumed as a stand-by position. The actual position of the stepping motor is stored in the stepping motor drive control apparatus. After the initialization and the setting of the stand-by position, the power-source relay is turned off, and thus the power to the stepping motor drive control apparatus is shut off.

During key on in which the internal combustion engine is operated, the stepping motor drive control apparatus begins to perform predetermined control on the assumption that the actual position of the stepping motor matches the stand-by position stored in the memory.

However, when, after initialization, power to the stepping motor drive control apparatus is shut off, a microcomputer contained in the stepping motor drive control apparatus is reset. Upon this resetting, the microcomputer outputs a signal of a fixed pattern, and upon receiving this signal, the excitation pattern of the stepping motor becomes a specific pattern. When the excitation pattern at this reset time is different from that when the initialization is terminated, the stepping motor is erroneously driven by the excitation pattern at the reset time.

Therefore, the actual position of the stepping motor during key on does not match the stand-by position stored in the memory and an error occurs, causing a problem that the stepping motor drive control apparatus cannot control the intake air amount regulating valve accurately. As a result, the flow rate of the intake air of the internal combustion engine cannot be adjusted accurately.

SUMMARY OF THE INVENTION

The present invention solves the above-described problems of the prior art. The stepping motor drive apparatus in accordance with the present invention does not introduce an error when driving the stepping motor after a power shut off. Rather, it adjusts the flow rate of intake air of the internal combustion engine with a high degree of accuracy and reliably.

The stepping motor drive apparatus in accordance with the present invention comprises a reset-time output pattern holding section for prestoring the excitation patterns output from the processing section when power to the processing section is shut off. An excitation pattern setting means sets a first drive amount of the stepping motor after the operation of the member to be controlled is stopped. The first drive amount is for initializing the regulating section to a reference opening, and outputting the amount to the processing section. Then, a second drive amount of the stepping motor is set, which amount is for setting the regulating section at a target opening. Thus, the excitation pattern of the stepping motor when the regulating section is set at the target opening matches the excitation pattern stored in the reset-time output pattern holding section. The drive amount is output to the processing section.

The apparatus of the invention also includes a power-source control section for shutting off the power source on the basis of the control by the processing section.

BRIEF DESCRIPTION OF THE DRAWINGS

FIG. 3 illustrates excitation patterns of a stepping motor and the operation of an intake air amount regulating valve;

DESCRIPTION OF THE PREFERRED EMBODIMENTS

First Embodiment

Figure 1:
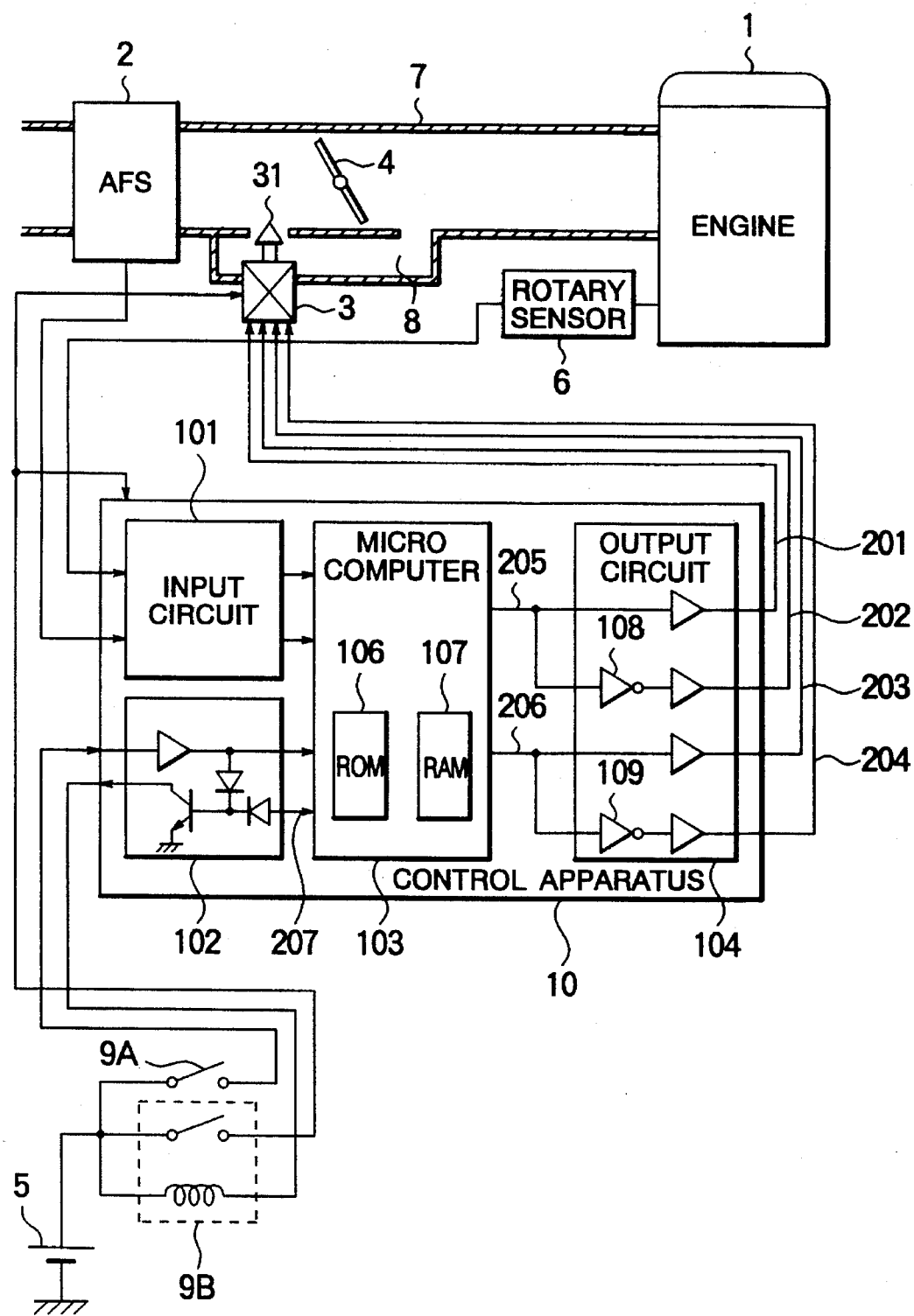
FIG. 1 is a block diagram of an embodiment of the present invention.

A first embodiment of the present invention will be explained below with reference to the accompanying drawings. FIG. 1 is a block diagram of an embodiment in which the present invention is applied to control the number of idle rotations of an internal combustion engine. Reference numeral 1 denotes an internal combustion engine to be controlled; reference numeral 2 denotes an air flow sensor (hereinafter referred to as an AFS) disposed in the inlet of an intake air pipe 7 of the internal combustion engine 1; reference numeral 4 denotes a throttle valve disposed in the intake air pipe 7, and an intake air amount regulating valve 31 is disposed in an intake air passage 8 which bypasses the throttle valve 4. The intake air amount regulating valve 31 is driven by a four-phase unipolar type stepping motor 3. Reference numeral 10 denotes a control apparatus which comprises an input circuit 101 for receiving signals output from a rotary sensor 6 which detects the number of rotations of the engine 1 and signals output from the AFS 2; a power-source circuit 102 for turning on/off the power source; a microcomputer 103 containing a ROM 106 and a RAM 107; and an output circuit 104 for outputting stepping motor drive signals 201, 202, 203 and 204 when the circuit receives an output from the microcomputer 103. Reference numeral 5 denotes a battery which is a power source; reference numeral 9A denotes a key switch for controlling the supply/stoppage of power; and reference numeral 9B denotes a power-source relay for shutting off the power to the microcomputer 103 on the basis of the output from the control apparatus 10.

The stepping motor drive signals 201 and 202 are both generated in accordance with a signal 205 output from the microcomputer 103. Since, however, the stepping motor drive signal 202 is output through an inversion circuit 108, the logic of on/off of the stepping motor drive signal 201 is opposite to that of the stepping motor drive signal 202. Both the stepping motor drive signals 203 and 204 are generated in accordance with a signal 206 output from the microcomputer 103. Since, however, the stepping motor drive signal 204 is output through an inversion circuit 109, the logic of on/off of the stepping motor drive signal 203 is opposite to that of the stepping motor drive signal 204.

Figure 2:
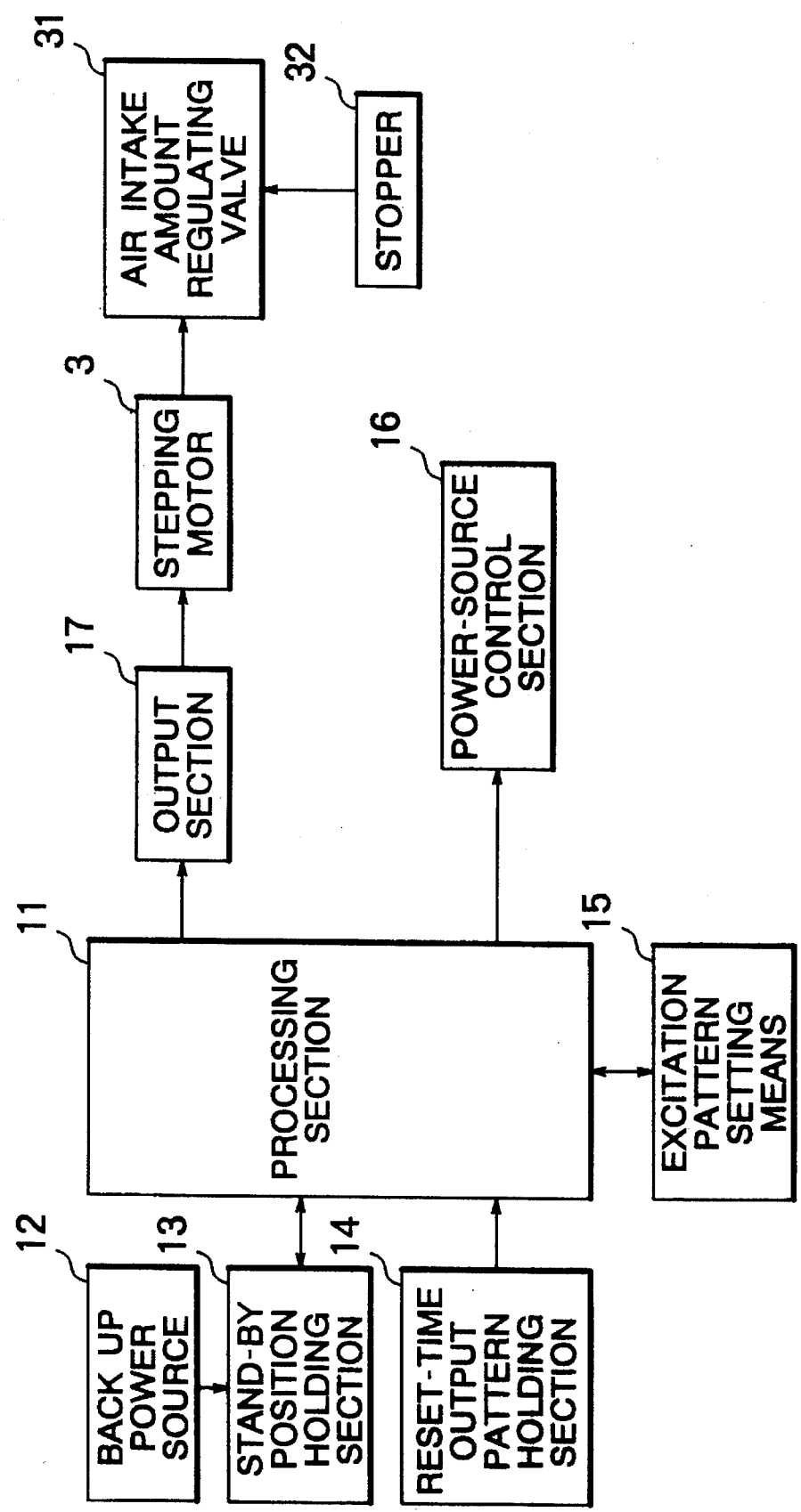
FIG. 2 is a function block diagram of the embodiment of the present invention.

FIG. 2 is a function block diagram of the first embodiment. Reference numeral 11 denotes a processing section; reference numeral 13 denotes a stand-by position holding section for storing the position of the stepping motor 3 during stand-by, which is backed up by a backup power source 12 so that the stand-by position can be held after the power is off; reference numeral 14 denotes a reset-time output pattern holding section for holding a pattern output to the stepping motor 3 when processing section 11 is reset, the output pattern of which at reset time being previously provided; reference numeral 15 denotes an excitation pattern setting means for setting an excitation pattern for driving the stepping motor 3 during initialization and when the stand-by position is set, the excitation pattern corresponding to the amount of driving of the stepping motor 3; reference numeral 16 denotes a power-source control section for performing the on/off control of the power source in accordance with an output of the processing section 11; reference numeral 17 denotes an output section for supplying an excitation pattern output from the processing section 11 to the stepping motor 3; reference numeral 31 denotes an intake-air amount regulating valve driven by the stepping motor 3; reference numeral 32 denotes a stopper for limiting the open/close range of the intake-air amount regulating valve 31. The processing section 11, the backup power source 12, the stand-by position holding section 13, the reset-time output pattern holding section 14 and the excitation pattern setting means 15 correspond to the microcomputer 103 of FIG. 1. The power-source control section 16 corresponds to the power-source circuit 102 and the power-source relay 9B, and the output section 17 corresponds to the output circuit 104 of FIG. 7.

FIG. 3 illustrates the relationship between excitation patterns determined on the basis of the stepping motor drive signals 201, 202, 203 and 204 and the direction in which the intake air amount regulating valve 31 is moved. An excitation pattern A1 is a pattern when the stepping motor drive signals 201, 202, 203 and 204 are on, off, on and off, respectively. Similarly, an excitation pattern A2 is a pattern when the signals 201, 202, 203 and 204 are on, off, off and on, respectively; an excitation pattern A3 is a pattern when the signals 201, 202, 203 and 204 are off, on, off and on, respectively; and an excitation pattern A4 is a pattern when the signals 201, 202, 203 and 204 are off, on, on and off, respectively. According to the figure, when the excitation pattern is switched in the following order: A1→A2→A3→A4→A1, the stepping motor 3 is driven forwardly, and the intake air amount regulating valve 31 is moved to the open side. On the other hand, when the excitation pattern is switched in the following order: A4→A3→A2→A1→A4, the stepping motor 3 is driven backwardly, and the intake air amount regulating valve 31 is moved to the close side.

Next, the operation will be explained with reference to the timing charts of the operations during key off in FIGS. 4 and 6, and the operation flow charts in FIGS. 5 and 7.

When the key switch 9A is turned off (during key off), the power-source relay 9B remains on at this time, an electric current is supplied to the control apparatus 10 for a fixed time from the key off time. The initialization is started when the key switch 9A is turned off and performed during this time.

Initially, the microcomputer 103 sets a position beyond the maximum drive range of the valve 31 as a target position of the stepping motor 3, and switches the excitation pattern in the following order shown in FIG. 3: A1→A2→A3→A4→A1, so that the target position matches the actual position of the stepping motor 3. As a result, the stepping motor 3 is moved along the forward direction, and the intake air amount regulating valve 31 is opened to hit a stopper 32. This operation is performed during a time period D1 of FIG. 4.

Since the target position of the stepping motor 3 is set beyond the maximum drive range of the valve 31, the microcomputer 103 switches the excitation pattern in the following order shown in FIG. 3: A1→A2→A3→A4→A1 even after the intake air amount regulating valve 31 has hit the stopper 32. This operation is performed during a time period D3 of FIG. 4. However, the intake air amount regulating valve 31 remains at the fully open stopper opening due to the stopper 32 as indicated by the solid line of FIG. 4. The dotted line of FIG. 4 indicates the position of the stepping motor 3.

Next, the fully open stopper opening is assumed as a reference opening, and the microcomputer 103 sets the actual position of the stepping motor 3 at the position corresponding to the reference opening. If the position corresponding to the reference opening is denoted as y2 and the actual position of the stepping motor 3 when the time period D3 is finished is denoted as y1, the microcomputer 103 performs an operation for substituting y2 for y1. Here, y1−y2=x where x corresponds to the number of times the excitation pattern is switched after the intake air amount regulating valve 31 has hit the stopper 32. This terminates the initialization.

Next, the microcomputer 103 sets the intake air amount regulating valve 31 at the target opening (stand-by position y3) during key off. Since the normal stand-by opening of the intake air amount regulating valve 31 is set at an intermediate opening of the maximum drive range, the microcomputer 103 switches the excitation pattern in the following order shown in FIG. 3: A4→A3→A2→A1→A4 until the actual position of the stepping motor 3 matches the stand-by position y3 corresponding to the target position. As a result, the stepping motor 3 is moved to the close side along the opposite direction. When the actual position of the stepping motor 3 matches the target position (stand-by position y3), the operation during key off is terminated. This operation is performed during a time period D2 of FIG. 4.

Thereafter, the microcomputer 103 turns off an output signal 207 and turns off the power-source relay 9B in order to shut off power. At this time, the microcomputer 103 is placed momentarily in the reset state. In the reset state, since signals 205 and 206 output from the microcomputer 103 are fixed to predetermined outputs at every time, the stepping motor drive signals 201, 202, 203 and 204 become fixed outputs of any of excitation patterns A1 to A4 of FIG. 3. If the exciting phase at this time is assumed as the excitation pattern A1 of FIG. 3, the intake air amount regulating valve 31 is driven along the direction in which it is opened when the excitation pattern at the time the operation during key off is terminated becomes the excitation pattern A4, and the intake air amount regulating valve 37 is driven along the direction in which it is closed when the excitation pattern at the time the operation during key off is terminated becomes the excitation pattern A2. Therefore, when the excitation pattern at the time the operation during key off is terminated is other than the excitation pattern A1 of FIG. 3, the stepping motor 3 is driven unnecessarily.

Since the stepping motor 3 is driven by switching excitation patterns, no matter how much the stepping motor 3 is driven along the open or close direction from the predetermined position, the excitation pattern when it is returned to the predetermined position is the same as the pattern before the intake air amount regulating valve 31 is driven. Therefore, if the excitation patterns at the stand-by position y3 and at reset time are the same, it is possible to prevent unnecessary driving at reset time.

The operation for the above will be explained with reference to FIGS. 2, 6 and 7. FIG. 6 shows the operation timing of a case in which no operation is performed during the time period D3 of FIG. 4.

Figure 6:
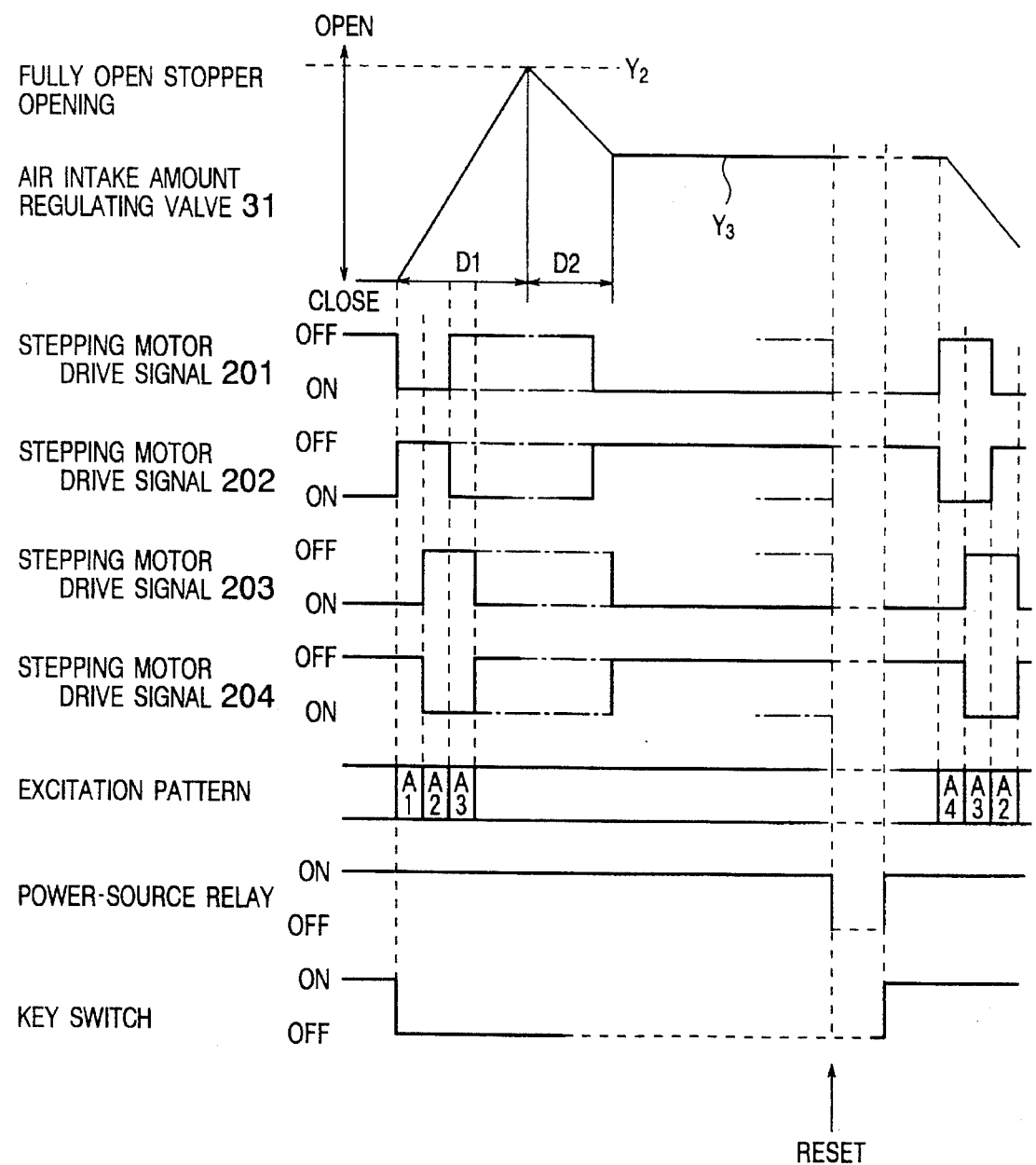
FIG. 6 is a timing chart of the operation of the stepping motor.
Figure 7:
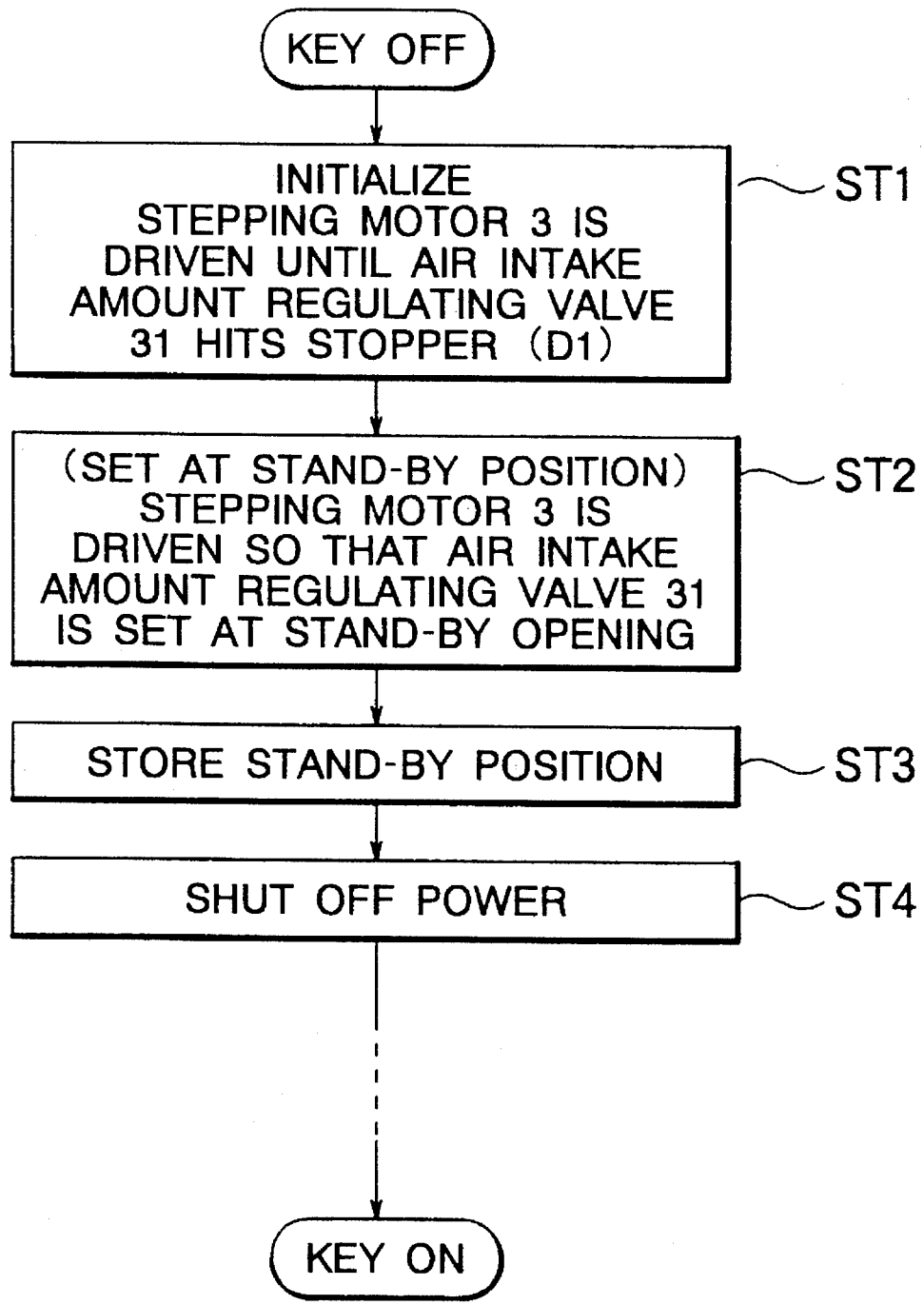
FIG. 7 is a timing chart of the operation of the stepping motor.

The processing section 11 of FIG. 2 first drives the stepping motor 3 until the intake air amount regulating valve 31 hits the stopper 32 in accordance with the flowchart of FIG. 7 (ST 1). This operation is performed in a time period D1 of FIG. 6. Next, the processing section 11 drives the stepping motor 3 so that the intake air amount regulating valve 31 reaches the stand-by opening y3 output from the excitation pattern setting means 15 (ST 2). This operation is performed in a time period D2 of FIG. 6. In ST2, the excitation pattern setting means 15 sets the stand-by position y3 in accordance with an instruction from the processing section 11 so that the excitation pattern at that time becomes the same as the output excitation pattern at reset time which has been previously stored in the reset-time output pattern holding section 14. The processing section 11 performs the operation of ST2 in accordance with an output from the excitation pattern setting means 15. Next, the processing section 11 outputs the set stand-by position y3 to the stand-by position holding section 13 where the stand-by position y3 is stored (ST 3). Since the stand-by position holding section 13 is backed up by the backup power source 12, the stand-by position can be maintained even after power is shut off. After these operations of ST1 to ST3, the processing section 11 issues a power shut-oil command to the power-source control section 16 so that the power source is shut off (ST 4). Thereafter, the processing section 11 stops its operation until it is powered on by the key switch 9A.

Figure 4:
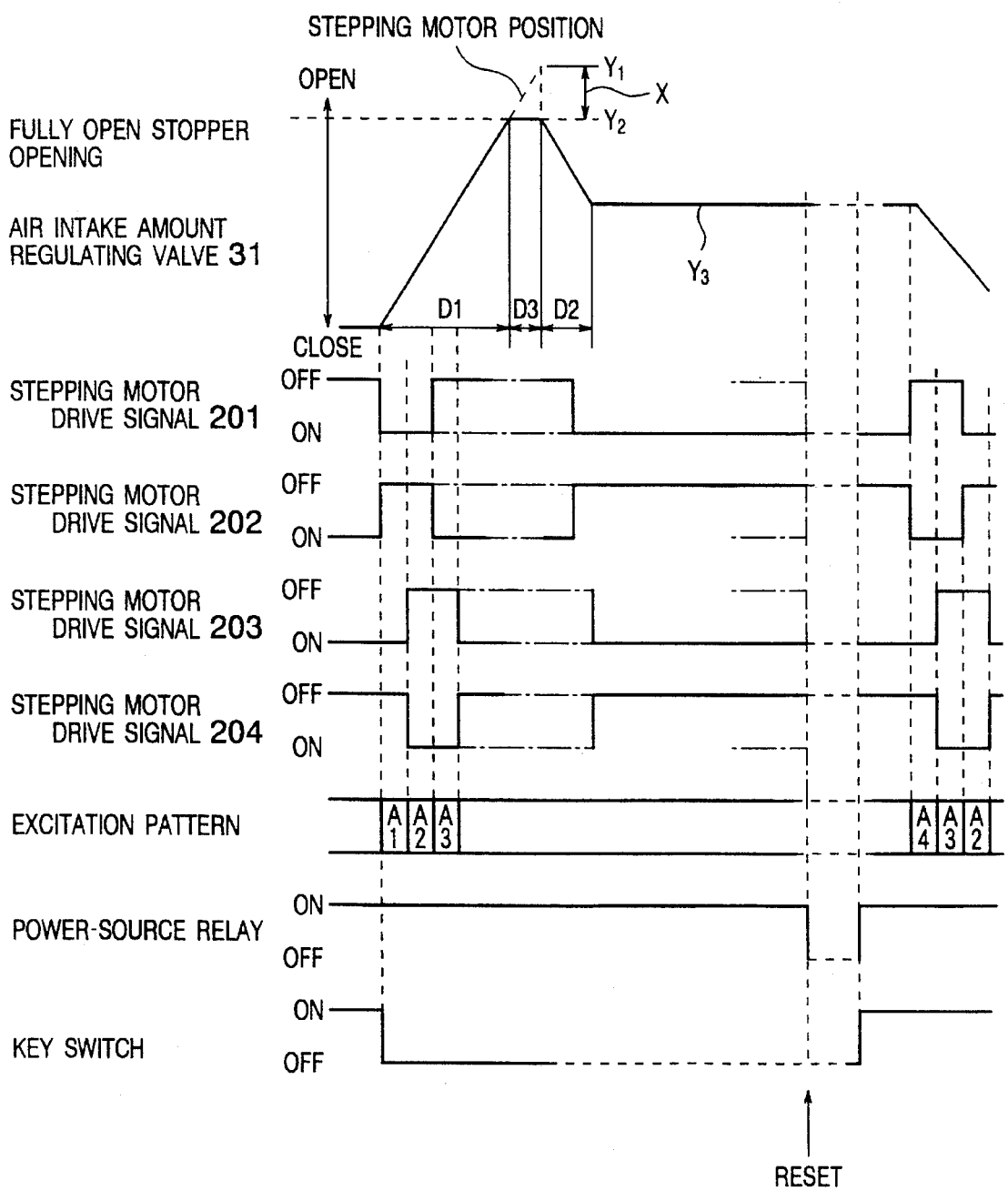
FIG. 4 is a timing chart of the stepping motor.

Next, referring to FIGS. 4 and 5, a description will be given of a case in which the excitation pattern is switched further by x after the intake air amount regulating valve 31 hits the stopper as shown in FIG. 4.

In this case, when the initialization of the stepping motor 3 is performed by the stepping motor 3, the number of times the stepping motor 3 is driven along the open direction does not match the number of times the stepping motor 3 is driven along the close direction (the number of times the excitation pattern is switched). The difference between these number of times is x. Therefore, in order for the stepping motor 3 not to perform an unnecessary operation at reset time, the difference x between the number of times of integrating driving along the open direction and the number of times of integrating driving along the close direction during initialization must be a multiple of 4 (the number of excitation patterns of the stepping motor 3). At this time, the excitation pattern of the stepping motor 3 when the time period D1 of FIG. 4 is finished matches the excitation pattern of the stepping motor 3 when the time period. D3 is finished. The microcomputer 103, on the basis of this condition, determines the number of times x the stepping motor 3 is driven along the open direction to the target position during initialization from when the intake air amount regulating valve 31 has hit the stopper.

Figure 5:
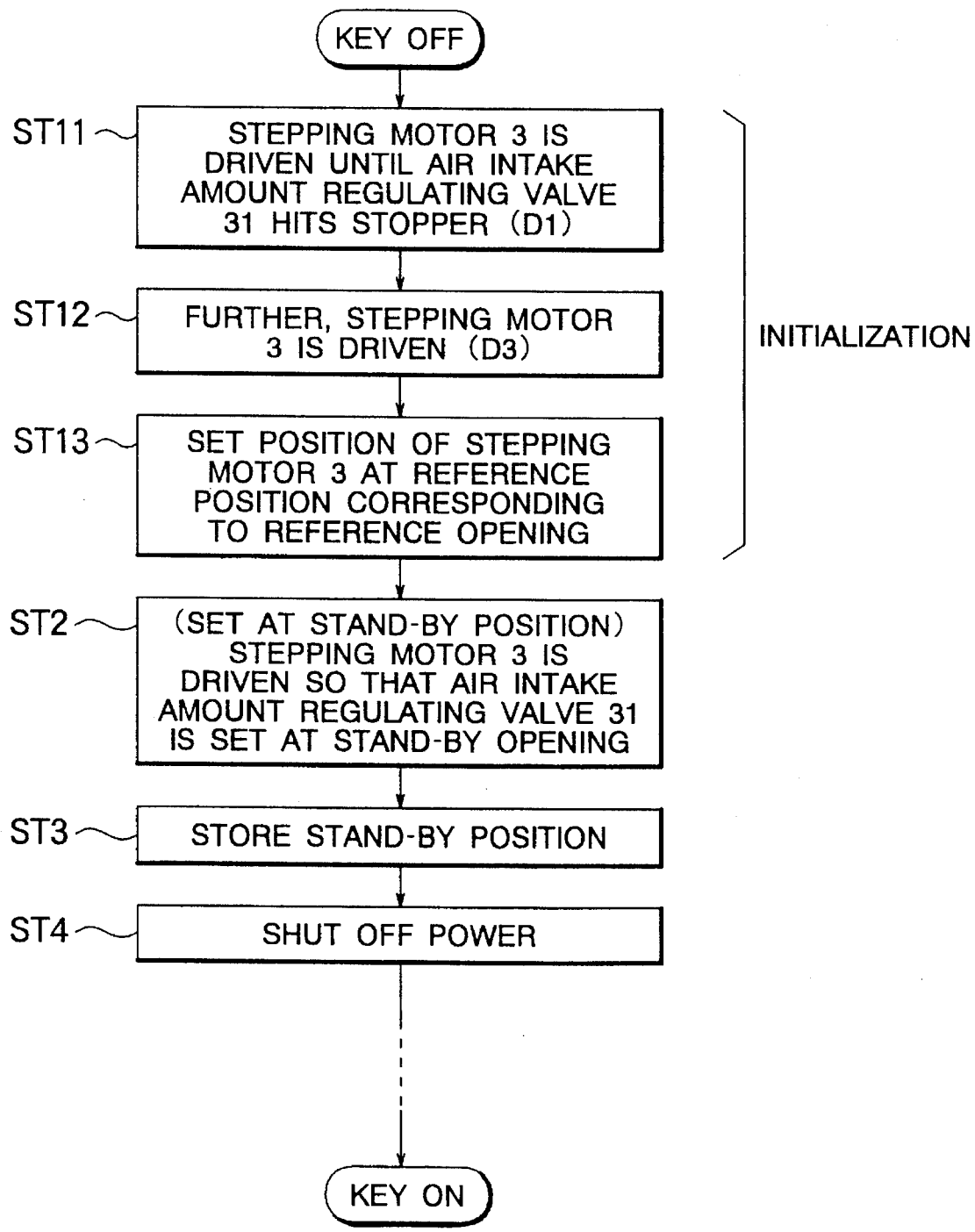
FIG. 5 is a flowchart of the operation of the stepping motor

As shown in the flowchart of FIG. 5, the processing section 11 shown in FIG. 2 drives the stepping motor 3 until the intake air amount regulating valve 31 hits the stopper 32 (ST 11). This operation is performed during the time period D1 of FIG. 4. Next, the processing section 11 further drives the stepping motor 3 for the number of x times (ST 12). x is determined to be a multiple of 4 on the basis of an output from the excitation pattern setting means 15. This operation is performed during the time period D3 of FIG. 4. Next, the processing section 11 sets the position of the stepping motor 3 at a reference position corresponding to the reference position. That is, y1 is set at y2 (ST 13). This terminates the initialization operation.

Next, the processing section 11 drives the stepping motor 3 so that the intake air amount regulating valve 31 reaches the stand-by position y3 output from the excitation pattern setting means 15 (ST 2). This operation is performed during the time period D2 of FIG. 4. In ST2, the excitation pattern setting means 15 sets the excitation pattern at the stand-by position y3 so that it matches the excitation pattern output at reset time which has been previously stored in the reset-time output pattern holding section 14. Next, the processing section 11 outputs the stand-by position y3 to the stand-by position holding section 13 where the stand-by position y3 is stored (ST 3). After these operations of ST11 to ST3, the processing section 11 issues a power shut-off command to the power-source control section 16 so that power is shut off (ST 4). Thereafter, the processing section 11 stops its operation until it is keyed on.

As described above, the excitation pattern during key on is matched with the excitation pattern of the microcomputer 103 during at reset time, and the target position is set so that the amount of hitting the stopper during initialization becomes a multiple of 4. Thus, it is possible to match the excitation pattern during key off with the pattern of the microcomputer 103 at reset time. The excitation pattern of the microcomputer 103 at reset time is previously determined.

Matching of the excitation pattern during key off with the pattern of the microcomputer 103 at reset time in the above-described manner makes it possible to prevent the stepping motor 3 from being erroneously driven during key on. Therefore, it is possible to control the intake air amount regulating valve 31 at the next key-on time with a high degree of accuracy and reliably.

In case where the backup power source 12 is off, since the microcomputer 103 does not recognize the opening of the intake air amount regulating valve 31 during key on, it cannot set the excitation pattern during key on. In such a case, the microcomputer 103 may substitute a predetermined value, e.g., 0 position for the initial value at the position during key on and the above-described initialization is started to set the stand-by position. The microcomputer 103 sets the intake air amount regulating valve 31 at the stand-by opening so that the excitation pattern at the stand-by position during key off matches that at reset time on the basis of this initial value. If this is done, even if the microcomputer 103 is reset after key on, the intake air amount regulating valve 31 will not be erroneously operated.

That is, when the microcomputer 103 sets the intake air amount regulating valve 31 from 0 position to the stand-by position, it is possible to make the excitation pattern during key on match with the excitation pattern at reset time if the remainder obtained by dividing the difference x' between the number of times of driving along the open direction and that of driving along the close direction by 4 becomes 0.

When the difference x' is not a multiple of 4, the microcomputer 103 operates in the following way. When the remainder obtained by dividing the difference x' from 0 position to the stand-by position is 1, the microcomputer 103 makes the excitation pattern displaced by 1 along the close direction from the pattern at reset time match with the the excitation pattern during key on. Similarly, when the remainder obtained by dividing the difference x' from 0 position to the stand-by position by 4 is n, the microcomputer 103 makes the excitation pattern displaced by n from the pattern at reset time match with the the excitation pattern during key on.

In the present invention, as is clear from the first embodiment, since the microcomputer 103 only needs to make the excitation pattern of the stepping motor 3 at the stand-by position match with the excitation pattern at reset time, the apparatus of the present invention may be arranged in such a way that the excitation pattern at each position is previously stored in the memory of the control apparatus and the stepping motor 3 is driven by the excitation pattern corresponding to the position. Further, although in the first embodiment, the present invention is applied to the number of idle rotations control apparatus, similar advantages can be obtained if it is applied to an EGR (exhaust gas recirculation) or purge flow-rate control apparatus.

What is claimed is:

1. A method for driving a stepping motor linked to a regulating valve, comprising the steps of:

determining a first amount of driving for setting said regulating valve at a reference position;

driving said stepping motor by said first amount of driving, thereby positioning said regulating valve at said reference position;

setting a second amount of driving for setting said regulating valve at a target position, said second amount of driving is calculated so that an excitation pattern of said stepping motor generated when a power source for driving said stepping motor is shut off matches the excitation pattern of said stepping motor when said adjustment section is set at the target position;

driving said stepping motor by said second amount of driving.

2. A method for driving a stepping motor according to claim 1, further comprising the steps of:

setting a third amount of driving subsequent to said second step, said third amount is calculated so that the excitation pattern of said stepping motor when the driving by said first amount of driving is terminated matches the excitation pattern of said stepping motor when the driving by said third amount of driving is terminated;

driving said stepping motor by said third amount of driving; and designating the position of said stepping motor subsequent to driving said stepping motor by said third amount as a reference position, and wherein in said first step, said first amount of driving is set so that said regulating valve reaches a stopper disposed at a position corresponding to the reference position of said regulating valve for regulating a movable range of said regulating valve.

3. A method for driving a stepping motor according to claim 1 wherein said regulating valve is an intake-air amount regulating valve of an internal combustion engine.

4. A method for driving a stepping motor according to claim 1, further comprising a fifth step for shutting off the power source for driving said stepping motor.

5. A stepping motor control apparatus comprising a power source circuit, an input circuit, an output circuit, and a microcomputer for controlling the operation of a stepping motor, said stepping motor being linked to a regulating valve, said microcomputer comprising:

a processing section outputting switching excitation patterns for driving said stepping motor and thereby operate said regulating valve;

a reset-time output pattern holding section for prestoring an excitation pattern to be supplied to said output circuit when said processing section is reset;

excitation pattern setting means for setting a first drive amount of said stepping motor for initialization of said regulating valve, said excitation pattern setting means outputting said first drive amount to said processing section for driving said stepping motor so as to set said regulating valve at a reference position, said excitation pattern setting means further setting a second drive amount of said stepping motor for setting said regulating valve at a target position;

wherein said excitation pattern setting means sets a last excitation pattern of said second drive amount to match the excitation pattern stored in said reset-time output pattern holding section, thereby initializing said stepping motor and setting said regulating valve at a target position using said last excitation pattern so as to avoid further incidental movement of said valve.

6. A stepping motor control apparatus according to claim 5, further comprising a stopper for limiting the movable range of said valve, said stopper disposed at a position corresponding to said reference position, and wherein said excitation pattern setting means further sets a third amount of driving of said stepping motor subsequent to said first amount of driving for driving said stepping motor further, wherein the last excitation pattern of said first amount of driving matches the last excitation pattern of said third amount of driving.

7. A stepping motor drive control apparatus according to claim 5, wherein said regulating valve is an intake-air amount regulating valve of an internal combustion engine.

8. A stepping motor control apparatus according to claim 5, further comprising a power-source control section for shutting off power to said control apparatus as determined by said processing section.

* * * * *